United States Patent [19]

Palminteri

[11] Patent Number: 4,691,354
[45] Date of Patent: Sep. 1, 1987

[54] VERTICAL INTERVAL DATA BLANKER

[75] Inventor: Craig R. Palminteri, Mount Prospect, Ill.

[73] Assignee: Zenith Electronics Corporation, Glenview, Ill.

[21] Appl. No.: 850,208

[22] Filed: Apr. 10, 1986

Related U.S. Application Data

[63] Continuation-in-part of Ser. No. 518,230, Jul. 28, 1983, abandoned.

[51] Int. Cl.<sup>4</sup> ............................................. H04N 7/167
[52] U.S. Cl. ........................................ 380/15; 380/20; 380/10
[58] Field of Search ............... 358/114, 120, 122, 123, 358/124, 155, 148

[56] References Cited

U.S. PATENT DOCUMENTS

| 4,336,554 | 6/1982 | Okada et al. | 358/120 |
| 4,408,225 | 10/1983 | Ensinger et al. | 358/120 |
| 4,488,183 | 12/1984 | Kinjo | 358/120 |

Primary Examiner—Stephen C. Buczinski
Assistant Examiner—Melissa L. Koltak

[57] ABSTRACT

A stretched vertical interval pulse is developed by a transistorized integrating circuit supplied with a composite sync signal applied to a data recovery and unscrambler circuit in a television decoder. The decoder includes a pair of transmission gates that are controlled respectively by VNX and VIX signals developed in the unscrambler circuit. The VNX signal is supplied through an OR gate to the normal transmission gate and the output of the vertical interval pulse stretcher is applied to the other input of the OR gate for delaying cutoff of the transmission gate by the VNX signal until occurrence of horizontal line 10, thus precluding blanking of post equalizing pulses.

7 Claims, 3 Drawing Figures

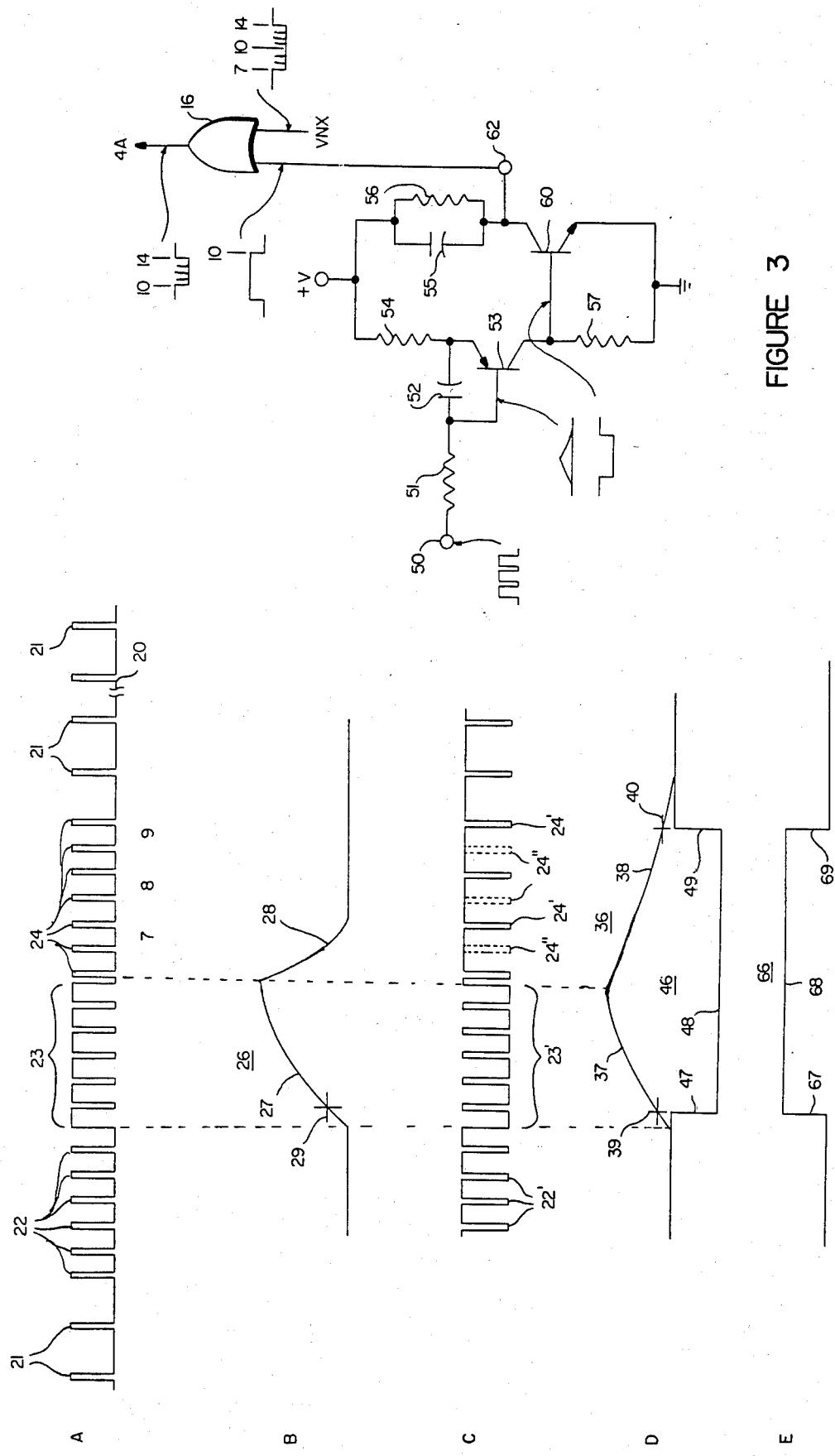

ously, equalizing pulses corresponding to horizontal lines 7, 8 and 9 are eliminated.

While most television receivers function satisfactorily without the three missing post equalizing pulses in the television signal, some video cassette recorders need the full complement of equalizing pulses in the television signal for timing purposes. Elimination of some of the post equalizing pulses creates problems in the operation of such video cassette recorders.

VERTICAL INTERVAL DATA BLANKER

CROSS REFERENCE TO RELATED APPLICATION

This application is a continuation-in-part of application Ser. No. 518,230, filed July 28, 1983, now abandoned.

BACKGROUND OF THE INVENTION AND PRIOR ART

This invention relates generally to television decoders and particularly to addressable cable television decoders capable of receiving data during the vertical intervals of a conventional television signal.

Most cable television systems utilize a form of signal scrambling to preclude unauthorized use of the television signals. A common form of television signal scrambling involves suppressing the synchronizing pulses and/or inverting the video information, both on a random basis. In order to receive a usable television signal, a viewer requires a decoder for restoring the suppressed synchronizing pulses and for decoding the video information. Unscrambling of the scrambled television signal is accomplished in response to appropriate decoding signals that are sent along with the scrambled signal by the cable operator.

Generally an addressable cable decoder is provided for receiving encoded data signals carried on one or more horizontal scan lines occurring during the vertical interval of a standard television signal. Typically, horizontal lines 10–13 are used. The decoder includes means for identifying the selected horizontal lines, usually by counting horizontal lines occurring during the vertical interval. Counting is initiated by a timing signal generated in response to the integrated vertical sync pulse. The decoder also includes logic means for producing signals for unscrambling the video portions of the scrambled television signal. The signals generally produced are the so-called VNX and VIX signals, representing video normal and video inverted, respectively. Application of these signals to control the operation of direct and inverting video amplifiers enables unscrambling of the video signal, which is then applied to a modulator operating at VHF channel ¾ frequency. Since the data on the horizontal lines in the vertical blanking interval would appear as white streaks on the television screen, blanking means are provided for rendering the direct video amplifier ineffective during the trace interval until line 14. The video is never inverted during the vertical interval, and the inverting video amplifier is therefore not active. The VNX signal, which also serves other purposes in the decoder, is used to control the blanking function. The VNX signal operates to control a transmission gate in series with the direct video amplifier to remove any information between horizontal sync pulses.

Those skilled in the art will appreciate that a standard television signal includes six pre-equalizing pulses followed by a serrated vertical sync pulse and six post equalizing pulses. The pre and post equalizing pulses and the serrations in the vertical pulse all occur at twice the normal horizontal line frequency. In the prior art circuit, the VNX signal commences blanking at about horizontal line 7 with the result that some of the post equalizing pulses are eliminated from the television signal since alternate post equalizing pulses appear as data between horizontal sync pulses. Specifically,

OBJECTS OF THE INVENTION

A principal object of this invention is to provide an improved television decoder.

Another object of this invention is to provide an addressable cable television decoder capable of satisfactory operation with all video cassette recorders.

A further object of this invention is to provide an addressable cable television decoder that solves the problems of the prior art.

BRIEF DESCRIPTION OF THE DRAWINGS

Other ojbects and advantages of the invention will be apparent by reading the following description thereof in conjunction with the drawings in which:

FIG. 2 illustrates a series of waveforms useful in explaining the invention and showing the prior art control pulse and a stretched vertical interval pulse as taught by the invention; and FIG. 3 is a schematic diagram of a circuit for generating the stretched pulse of FIG. 3.

DESCRIPTION OF THE PREFERRED EMBODIMENT

Figure 1:
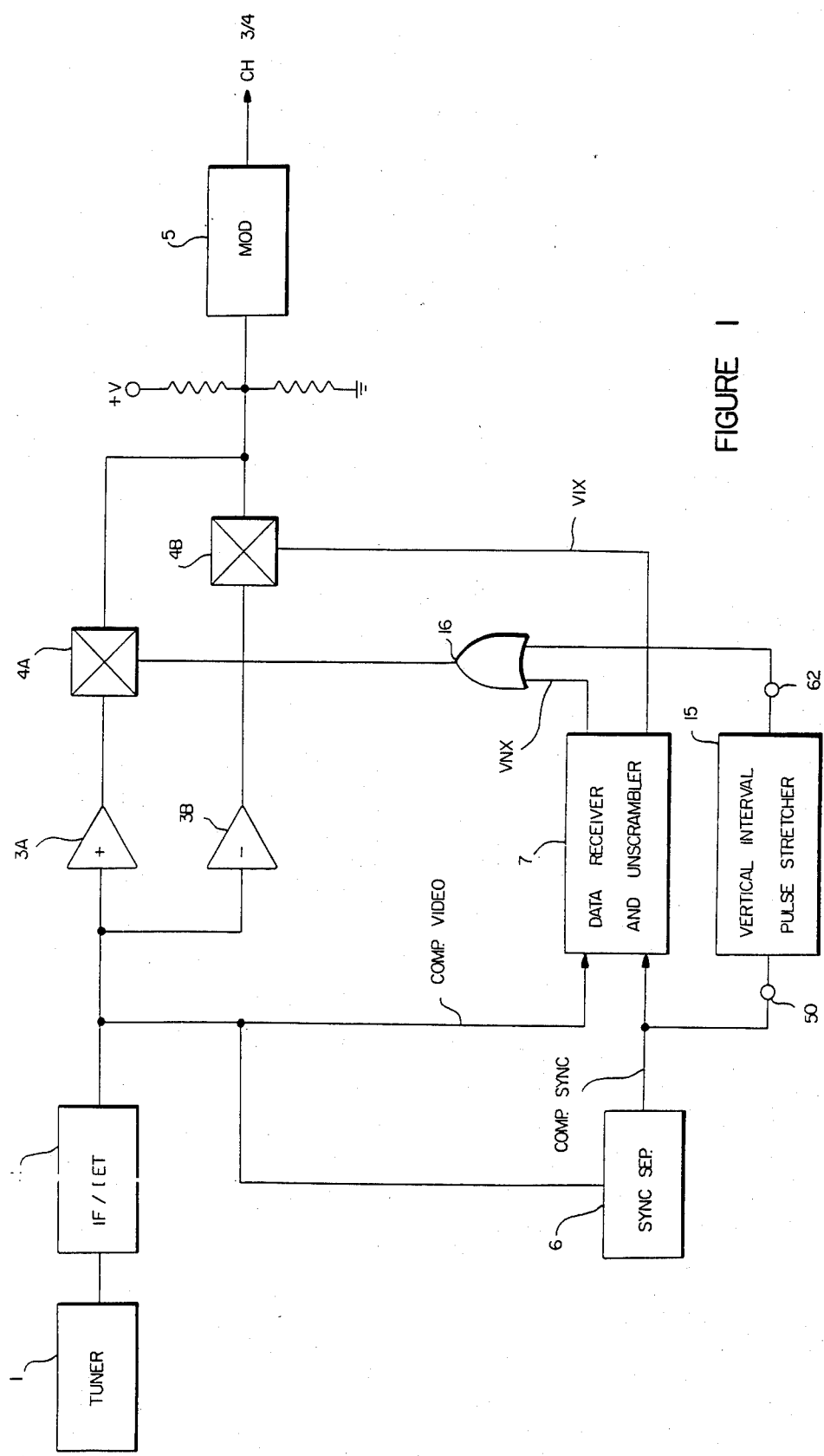
FIG. 1 is a partial block, partial schematic diagram of the decoder of the invention.

Referring to FIG. 1, a tuner 1 receives a television signal scrambled as discussed above, and couples it to an IF/detector 2 where it is detected. The composite video signal is supplied to a pair of video amplifiers 3A and 3B, with amplifier 3A being a direct video amplifier and amplifier 3B being an inverting video amplifier. The outputs of video amplifiers 3A and 3B are connected, respectively, to a pair of transmission gates 4A and 4B, the outputs of which are supplied to the junction of a resistive voltage divider which supplies a modulator 5 for remodulating the video signal present at the junction of the voltage divider to VHF channel ¾. The composite video signal from IF/detector 2 is also supplied to a sync separator circuit 6 and to a data receiver and unscrambler circuit 7. The output of sync separator 6 is also supplied to unscrambled 7 and, in accordance with the invention, to an input terminal 50 of a vertical interval pulse stretcher 15. As mentioned, data receiver and unscrambled 7 includes well known logic means for developing the video normal signal (VNX) and the video inverted signal (VIX). The VIX signal is supplied to the control input of transmission gate 4B whereas the VNX signal is supplied to one input of an OR gate 16, the output of which is connected to the control input of transmission gate 4A. The other input of OR gate 16 is coupled to the output terminal 62 of vertical interval pulse stretcher 15. As will be seen, pulse stretcher 15 delays operation of transmission gate 4A by the VNX signal for a time sufficient to assure that no post equalizing pulses are blanked. Those skilled in the art will appreciate that suppressed sync signals need not be incorporated and that the invention is not dependent upon use of suppressed sync, or video inversion. Thus, the circuit diagrams do not indicate suppressed sync restoration circuitry (which is well known in the art) for simplicity.

The VNX and VIX signals control operation of the transmission gates. When VNX and VIX are high, their connected transmission gates exhibit a low impedance between their input and output; when VNX and VIX are low, the transmission gates exhibit a high impedance. The VNX and VIX signals assume the proper states to allow the video signals from video amplifiers 3A and 3B to be selectively coupled to the junction of the voltage divider which determines the blanking level of the reconstituted or unscrambled signal. The VNX signal is at a low level for a portion of the vertical interval to blank the data from the reconstituted video signal and preclude white streaks in the display. As will be seen, VNX is delayed during the vertical interval to prevent blanking until occurrence of HL10.

Waveform A of FIG. 2 illustrates the composite sync portion of a conventional television signal. The horizontal sync pulses 21 occur at the conventional line frequency rate of 15.75 KHz. The spaces between adjacent horizontal sync pulses, are compressed for illustrative purposes. The six pre-equalizing pulses 22 are followed by a serrated vertical sync pulse 23 which, in turn, is followed by six post equalizing pulses 24. As mentioned, the equalizing pulses and the serrations in the vertical sync pulse occur at twice the horizontal line rate. In practice, the horizontal lines occurring during the vertical interval are numbered as illustrated (7,8,9 . . . 20). This waveform is well known in the art and is believed to need no further explanation.

Waveform B represents a control signal 26 produced by applying waveform A to a conventional resistance-capacitance integration network (not shown) in unscrambler 7. The control signal will also be recognized as representative of those generated in the vertical circuits of conventional television receivers. The control signal includes a rising portion 27 and a falling portion 28 with the voltage level at point 29 corresponding to a voltage threshold for initiating horizontal line counting means and the VNX signal (by conventional means not shown) in unscrambled 7.

Waveform C is an opposite polarity version of a portion of waveform A with pre-equalizing pulses 22′, serrated vertical sync pulses 23′, and post equalizing pulses 24′, and is illustrative of that produced in unscrambler 7. It should be noted that the post equalizing pulses corresponding to horizontal lines numbered 7, 8 and 9, are missing as indicated by the dashed line pulses 24″. These represent the alternate post equalizing pulses which the prior art circuit removes because of the operation of the VNX signal on a transmission gate such as transmission gate 4A. It is the loss of these three post equalizing pulses 24″ in the television signal that gives rise to the above-mentioned timing problems in some video cassette recorders.

Waveform D includes two superimposed curves. A signal 36, having a rising portion 37 and a falling portion 38, results from applying a conventional serrated vertical pulse (waveform A) to a transistor having an integrating circuit coupled across its input. It is clear that signal 36 has a much longer duration than control signal 26. The point 39 on signal 36 corresponds generally to threshold voltage point 29 on control signal 26, but point 40, the point where the falling edge of waveform 37 reaches the same voltage threshold as for point 39, is seen to occur well after the last post equalizing pulse 24″.

A square wave pulse 46 is developed in response to signal 36 and includes a negative-going leading edge 47, a steady portion 48 and a positive-going trailing edge 49. Negative-going edge 47 and positive-going edge 49 correspond generally to points 39 and 40 of signal 36. The sharply defined delayed edge 49 of square wave pulse 46 is used to prevent the VNX signal from blanking the three post equalizing pulses. An opposite polarity square wave pulse 66 includes portions 67, 68 and 69 corresponding to portions 47, 48 and 49, respectively, of pulse 46. Pulse 66 illustrates a stretched vertical interval pulse developed with the circuit of the invention for delaying initiation of blanking by the VNX signal.

In FIG. 3 the composite sync signal (waveform A) is applied to terminal 50 of pulse stretcher 15 which, it will be recalled, is directly connected to one input of unscrambled 7 in FIG. 1. Terminal 50 is coupled through the series connection of a resistor 51 and a capacitor 52 to the emitter of a PNP transistor 53, the base of which is returned to the junction of the resistor and capacitor. Its emitter is also connected, through a resistor 54, to a source of positive potential $+V$ and its collector is connected to ground through a resistor 57. Resistor 51 and capacitor 52 form an integrating circuit for supplying the emitter-base input of transistor 53.

The collector output of transistor 53 is also connected to the base of an inverting NPN transistor 60 having an emitter connected to ground and a collector connected to $+V$ hrough the parallel arrangement of a capacitor 55 and a resistor 56. These components act as a high frequency filter to smooth out the signal waveforms. The collector of transistor 60 is connected to output terminal 62 for supplying an inverted replica of the stretched pulse presented to its base input. Terminal 62 supplies the stretched pulse to OR gate 16, which is also supplied with the VNX signal.

In operation, transistor 53 is held conductive for sync pulses of normal duration. The wider serrated vertical sync pulse charges capacitor 52 through resistor 51 to develop the rising portion 37 of signal 36. The charge level is reflected in a base-emitter voltage change on transistor 53 which drives it out of conduction. When transistor 53 switches off, its collector voltage becomes less positive and cuts off inverter transistor 60, which is also normally conducting. Meanwhile capacitor 52 continues to charge, through resistor 51, from the serrated vertical sync pulse. It begins to discharge when the shorter duration post equalizing pulses occur. Its discharge curve is illustrated as falling portion 38 of signal 36 and, when it declines to the point where the emitter-base junction of transistor 53 is forward biased, transistor 53 is again driven into conduction and, in turn, drives transistor 60 into conduction. Thus the circuit of FIG. 3 develops a stretched vertical interval pulse that is applied to OR gate 16 to delay operation of transmission gate 4A by the negative-going VNX signal to blank the video between horizontal sync pulses until after occurance of the post equalizing pulses. As shown in the waveforms adjacent to OR gate 16, the VNX signal is low from HL7 to HL14. As indicated by the spikes in the waveform for VNX, the VN signal goes high when the horizontal blanking pulse is expected to permit horizontal sync to be coupled even though video data is blanked. In the absence of the stretched pulse of the invention, transmission gate 4A would be cut off during this period with the consequent loss of the equalizing pulses. The stretched signal, however, goes high and remains high until HL10, which effectively delays the blanking effect of the VN signal until both inputs of OR gate 16 are low, which occurs between HL10 and HL14. This is shown by the waveform at the output of OR gate 16 which is low from HL10 to HL14. Thus with the invention the signal output of the decoder contains the full complement of post equalizing pulses.

It is recognized that numerous modifications and changes in the described embodiment of the invention will occur to those skilled in the art without departing from the true spirit and scope thereof. The invention is to be limited only as defined in the claims.

What is claimed is:

1. In an addressable cable television signal decoder of the type including means for recovering data carried on one or more horizontal lines occurring during the vertical blanking interval of a conventional television signal that includes a serrated vertical sync pulse and pre and post equalizing pulses, and including data receiver and unscrambler means for recovering said data, developing a VNX signal for blanking said data from said television signal and for generating a control signal by integration of said serrated vertical sync pulse to control generation of said VN signal, and a transmission gate controlled by said VNX signal; the improvement comprising:

means for generating an additional stretched pulse signal by integration of said serrated vertical sync pulse;

gate means coupled to said transmission gate; and means for applying said stretched pulse signal and said VNX signal to said gate means to delay blanking of said data by said VNX signal until after occurrence of said post equalizing pulses.

2. A decoder as set forth in claim 1 wherein the trailing edge of said stretched pulse signal occurs at horizontal line 10 in said vertical interval.

3. A decoder as set forth in claim 2 wherein said means for generating said stretched pulse signal include a transistor.

4. A decoder as set forth in claim 3 further including:

an R-C integrating network coupled to the input of said transistor;

means supplying said serrated vertical sync pulse to said integrating circuit; and means coupling the output of said transistor to said gate means for supplying said stretched pulse signal thereto, said transistor being normally conductive until said serrated vertical sync pulse charges said integrating network.

5. A decoder as set forth in claim 4 wherein said gate means comprises an OR gate.

6. An addressable cable television signal decoder comprising:

means for receiving and detecting a television signal including a serrated vertical pulse and post equalizing pulses;

means for recovering data on one or more horizontal lines in the vertical blanking interval of said television signal;

means for remodulating said detected television signal to VHF channel $\frac{3}{4}$;

means for developing a blanking signal for blanking said data from said remodulated television signal;

integrating means for developing a stretched vertical interval pulse from said serrated vertical pulse;

gate means for controlling blanking of said data from said remodulated television signal; and means for applying said blanking signal and said stretched pulse to said gate means for delaying operation of said gate means by said blanking signal until after occurance of said post equalizing pulses.

7. A decoder as set forth in claim 6 wherein said integrating means includes a transistor and wherein said gate means comprises an OR gate.

* * * * *

UNITED STATES PATENT AND TRADEMARK OFFICE
CERTIFICATE OF CORRECTION

PATENT NO. : 4,691,354
DATED : September 1, 1987
INVENTOR(S) : Craig R. Palminteri It is certified that error appears in the above-identified patent and that said Letters Patent is hereby corrected as shown below:

In claim 1, col. 5, line 26, change "VN" to --VNX--.

In claim 6, col. 6, line 25, change "$\frac{3}{4}$" to --3/4--.

Signed and Sealed this

Eighth Day of November, 1988

Attest:

DONALD J. QUIGG

Attesting Officer

Commissioner of Patents and Trademarks